United States Patent
Rashidi Doust

(10) Patent No.: US 10,274,668 B2
(45) Date of Patent: Apr. 30, 2019

(54) FLAT CEILING LIGHT FIXTURE

(71) Applicant: ELITE LIGHTING, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 15/637,793

(22) Filed: Jun. 29, 2017

(65) Prior Publication Data

US 2018/0341059 A1   Nov. 29, 2018

Related U.S. Application Data

(63) Continuation-in-part of application No. 29/605,264, filed on May 24, 2017.

(51) Int. Cl.
*F21V 8/00* (2006.01)

(52) U.S. Cl.
CPC .......... *G02B 6/0088* (2013.01); *G02B 6/0051* (2013.01); *G02B 6/0055* (2013.01)

(58) Field of Classification Search
CPC ... G02B 6/0088; G02B 6/0055; G02B 6/0051
See application file for complete search history.

(56) References Cited

U.S. PATENT DOCUMENTS

| | | | | |
|---|---|---|---|---|
| 6,003,258 A | * | 12/1999 | Godfrey | G09F 7/12 40/574 |
| 2012/0320627 A1 | * | 12/2012 | Araki | F21S 8/04 362/608 |
| 2013/0329460 A1 | * | 12/2013 | Mathew | H05K 5/02 362/612 |
| 2016/0215932 A1 | * | 7/2016 | Myers | F21S 8/04 |

* cited by examiner

*Primary Examiner* — Tracie Y Green
(74) *Attorney, Agent, or Firm* — Payam Moradian

(57) ABSTRACT

Provided is a light fixture comprising: a) a frame; b) a metal backing attached to the frame; and c) one or more LED strips with a plurality of light sources placed running in a horizontal direction against a side of the frame, the LED strip placed in such manner that the light source of the LED strip has a vertical orientation and faces inside of the frame. Provided is a light fixture comprising: a) a frame; b) a metal backing attached to the frame; and c) one or more LED strips with a plurality of light sources placed running in a horizontal direction against a side of the frame, the LED strip placed in such manner that the light source of the LED strip has a vertical orientation and faces inside of the frame. d) a glass sheet placed in front of the LED strip; e) a film sheet below the LED strip; f) a reflective sheet behind the glass sheet; and g) a metal sheet behind the reflective sheet.

20 Claims, 4 Drawing Sheets

B

FLAT CEILING LIGHT FIXTURE

CROSS-REFERENCE

The present application claims the benefit of U.S. application Ser. No. 29/605,264, filed on May 24, 2017, which is incorporated herein by reference in its entirety.

BACKGROUND SECTION OF THE INVENTION

LED (light emitting diode) require less energy compared to traditional light sources. There is a need in the art for light fixtures that utilize LED lights, particularly in different settings, such as an MRI (Magnetic Resonance Imaging) room.

SUMMARY SECTION OF THE INVENTION

Provided is a light fixture comprising: a) a frame; b) a metal backing attached to the frame; and c) one or more LED strips with a plurality of light sources placed running in a horizontal direction against a side of the frame, the LED strip placed in such manner that the light source of the LED strip has a vertical orientation and faces inside of the frame. The LED strip may not be visible when looking at the light fixture from outside. The fixture can have a sheet of transparent material placed directly in front of the light sources. The sheet of transparent material can be glass. The glass can have pores to direct the light. The light fixture can have two LED strips placed parallel to each other. The fixture can further comprise a sheet of a film placed below the sheet of transparent material. The fixture can further comprise a reflective sheet placed on top of the transparent sheet. The fixture can further comprise a metal backing sheet to enclose the light fixture from top. The metal can be aluminum. The fixture may not be ferromagnetic. The fixture can further comprise a layer of foam placed directly below the metal backing. The frame can have a vertical portion that is further inside the light fixture than the vertical portion making the periphery of the frame. The LED strips can be placed directly on the vertical portion that is further inside. A void can exist behind the vertical portion that is further inside. The vertical/void portion that is further inside is configured to receive fasteners.

Provided is a light fixture comprising: a) a frame; b) a metal backing attached to the frame; and c) one or more LED strips with a plurality of light sources placed running in a horizontal direction against a side of the frame, the LED strip placed in such manner that the light source of the LED strip has a vertical orientation and faces inside of the frame. d) a glass sheet placed in front of the LED strip; e) a film sheet below the LED strip; f) a reflective sheet behind the glass sheet; and g) a metal sheet behind the reflective sheet. The frame can have a vertical portion that is further inside the light fixture than the vertical portion making the periphery of the frame. The LED strips can be placed directly on the vertical portion that is further inside. The LED strip may not be visible when looking at the light fixture from outside. Two LED strips can be placed parallel to each on opposing sides of the glass sheet.

DETAILED DESCRIPTION OF THE INVENTION

Figure 1:
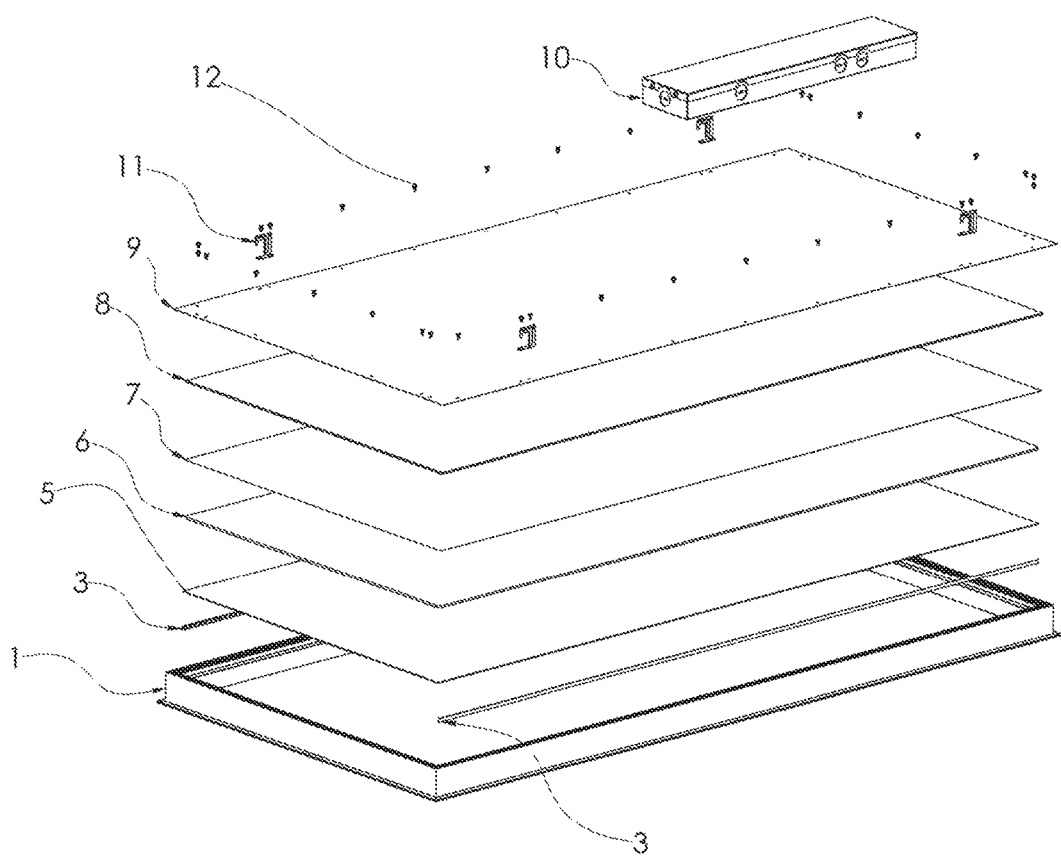
FIG. 1 illustrates an exploded view of the light fixture with frame.

FIG. 1 illustrates an exploded view of the light fixture with frame 1, LED strip 3, diffused lens panel 5, light guide plate 6, reflective sheeting 7, back light foam 8, aluminum backing sheet 9, t-bar hanger 11, screw 12, and ballast room 10. Frame 1 can have a geometric shape, like a square or rectangle. A rectangular frame is shown in FIG. 1. Two LED strips 3 are placed each in a vertical orientation (on their shortest sides) against the long sides of the rectangular frame.

Figure 2:
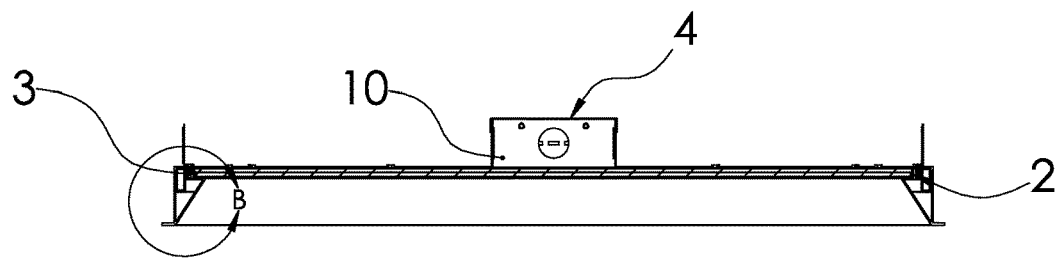
FIG. 2 illustrates a cross-section of the light fixture.

FIG. 2 illustrates a cross-section view of the light fixture. Frame 1 has a vertical 1v and slanted 1s portion. The slanted portion 1s starts from the bottom of frame 1 and moves inwards and upwards. The slant 1s of frame 1 allows for hiding LED strip behind the frame so that LED strip 3 is not visible to the naked eyes when looking at the light fixture.

Figure 3:
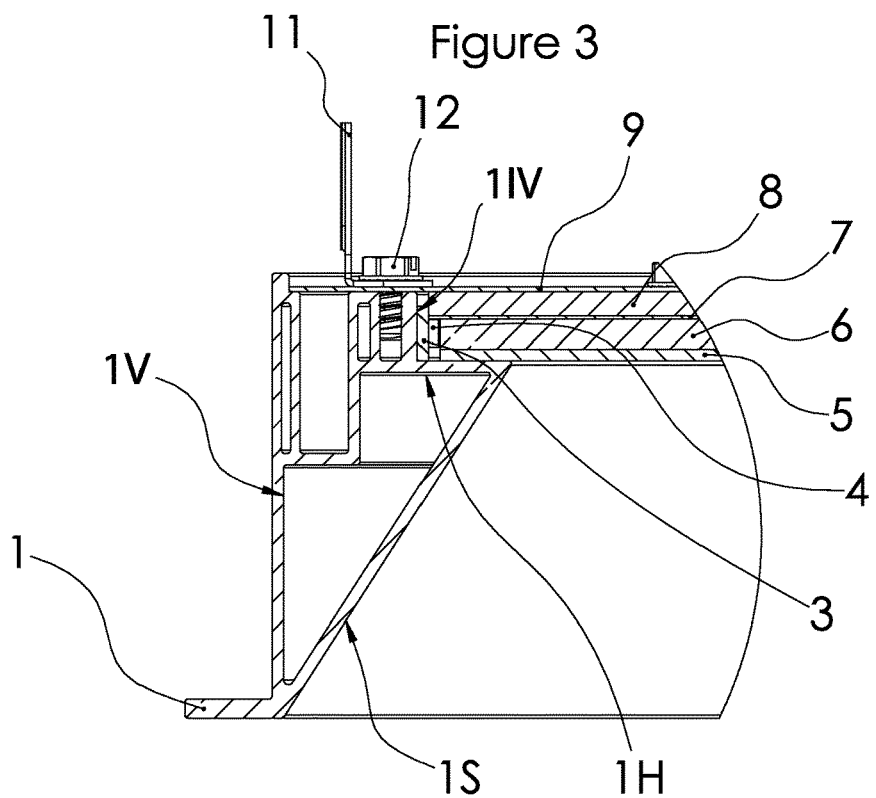
FIG. 3 illustrates a section B of FIG. 2.

FIG. 3 illustrates a closer view of cross-section B of FIG. 2. Frame 1 can have a smaller vertical portion 1iv that is more inward for placement of the LED strips. The LED strips 3 can be placed in a vertical orientation against frame 1 on the smaller vertical portion 1iv. The LED light 4 of the strip 3, which typically has a square or rectangular surface, is placed directly in front of light plate guide 6. LED light 3 is placed directly in front of light guide 6, which can be a sheet of glass or other transparent material. The height of LED light 3 is same or smaller than the height of light guide 6 so that all the light would enter light guide 6. The light fixture has two LED strips 3 placed parallel to each other. Each LED strip 3, which has multiple LEDs 4, lights up the light guide 6 from one side. Frame 1 and backing sheet 9 can be made from aluminum.

Below light guide 6, diffused lens panel 5 can be placed, which can be a film. The film can be made of vinyl and can filter the color/amount of light from light guide 6.

A reflective sheet 7 can be placed on top of plate guide 6. The reflective sheet 7 can be a white glossy sheet to reflect the light going upward in a downward direction and absorb minimal amount of light. The color and texture of the reflective sheet 7 can be changed if a user seeks to change the color or intensity of the light.

A metal backing sheet 9 can be placed on top to enclose the light fixture from the top. The metal can be aluminum, so that the light fixture can be used in an MRI room. The metal backing 9 can be a rectangular or a square piece of metal.

A back light foam 8 can be placed in between the reflective sheet 7 and metal backing sheet 9. A layer of foam 8 allows for keeping the reflective sheet 7 straight and in position, and/or deflect the light downward.

T-Bar Hanger 11 allows for hanging the light fixture to a support structure, such as a ceiling. There can be a total of four T-Bar hangers 11, with each hanger in proximity to each corner of the light fixture.

Fastener (Screw) 12 are placed from top of the fixture though openings in metal backing sheet 9 and can be received by a void behind the smaller vertical portion 1iv.

Ballast Room 13 can house the electronic from the light fixture, such as a power management unit that received electricity from an external source (outlet) and then directs electricity to each of the LED strips in a suitable form. The ballast room can be attached to metal backing 9 and have wires that travel from ballast room 13 to metal backing 3 though complementary openings.

FIG. 2 illustrates the frame having a flat central portion and sides that come down on each sides of the flat portion. The sides of the cross-section view are shown in detail in FIG. 3. The sides of the frame have a triangular shaped support. A member of the side moves in a slanted manner 1s (angle 25 to 75 at bottom) from the bottom of the vertical side portion 1v. The member terminates below the vertical portion 1v of the sides of the frame. The space formed by early termination of the slanted portion 1s creates a slot on top of the slanted portion 1s where the LED strip 3 and different layers can be placed. The LED strip 3 is placed in a vertical orientation 1v and outward in relation to the slanted portion 1s of the frame. Where the slanted portion 1s of the frame ends, there can be a horizontal portion 1h that goes outward (towards the sides). The short side (height) of the LED strip 3 is placed on top of the horizontal portion 1h. The long side of the LED (width) 3 is placed against a vertical portion 1iv of the frame that is attached to the top of the horizontal portion 1h. Behind the vertical portion 1iv a void space can be placed so to allow the vertical portion 1iv to cool down in the event it gets heated. The void space also is configured to receive fastener 12

The LED strip 3 has a plurality of LED lights 4. The side of plate guide 6 is placed directly in front of the light 4 of the LED strip 3. The components of the light fixture are placed in layers in relation to plate guide 6. Reflective sheet 7 is placed on top of plate guide 6, followed by back light foam 8, and metal backing 9. The ends of reflective sheet 7 can rest on LED strip 3. Lens panel 5 is placed in front of LED strip 3 and below plate guide 6.

A back light foam 8 can be placed in between the reflective sheet 7 and metal backing sheet 9. A layer of foam 8 allows for keeping the reflective sheet 7 straight and in position.

T-Bar Hanger 11 allows for hanging the light fixture to a support structure, such as a ceiling. The can be a T-Bar hanger 11 in proximity to each corner of the light fixture.

Figure 4:
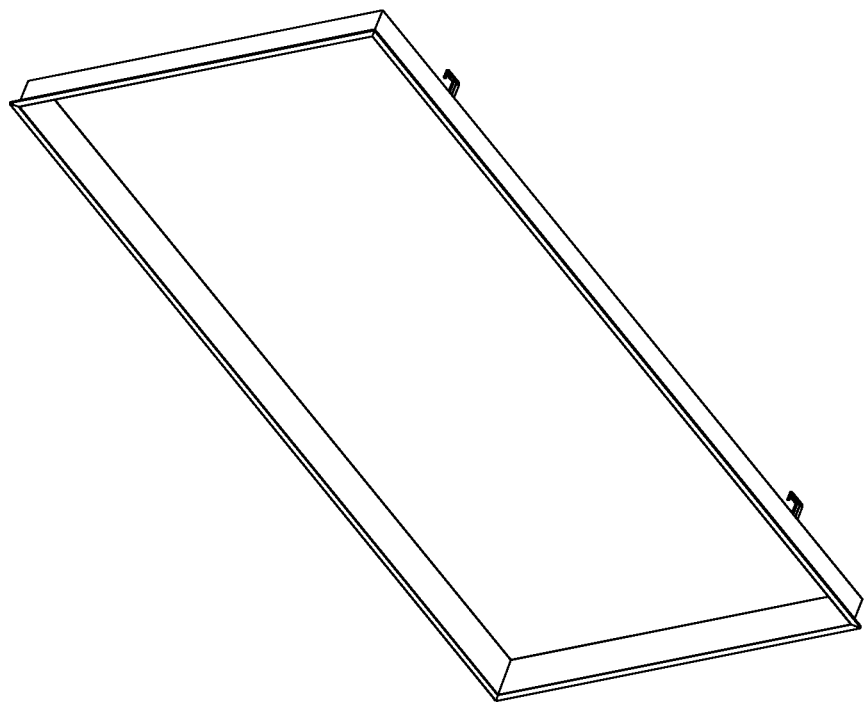
FIG. 4 illustrates a bottom perspective view of the light fixture.

FIG. 4 illustrates a bottom perspective view of the light fixture. No source of light is visible to a user. The LED strips 3 are placed behind the inner slanted portion of the frame 1.

Figure 5:
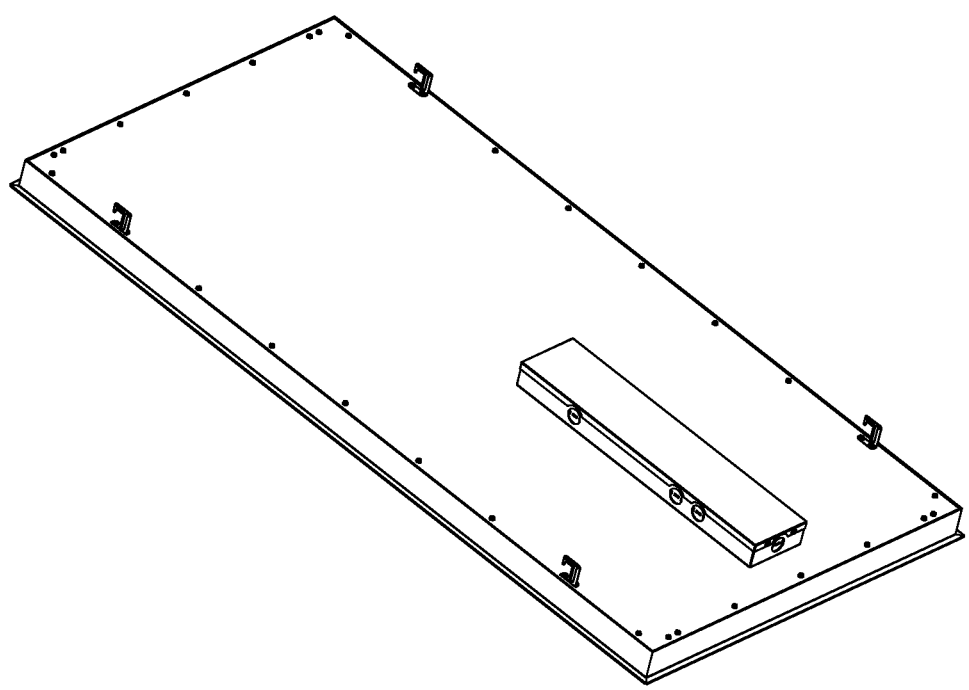
FIG. 5 illustrates a top perspective view of the light fixture.

FIG. 5 illustrates a top perspective view of the light fixture 1. Illustrated in the view are fasteners 12 holding metal backing 9 in place. T-Bar Hangers 11 are fastened to metal backing 9. Ballast room 10 is attached on top of the metal backing 9.

1. Frame
3. LED Strip
4. LED light
5. Diffused lens panel
6. Light guide plate
7. reflective sheeting
8. Back light foam
9. Aluminum backing sheet
10. Ballast Room
11. T-Bar Hanger
12. Fastener (Screw)

What is claimed is:

1. A light fixture comprising:
   a) a frame;
   b) a metal backing attached to a back of the frame;
   c) a foam placed below the metal backing;
   d) a reflective sheet placed below the foam; and
   e) one or more LED strips with a plurality of light sources placed running in a horizontal direction against a side of the frame, the LED strip placed in such manner that the light source of the LED strip has a vertical orientation and the light source faces inside of the frame;
   wherein placement of the foam is configured to keep the reflective sheet straight and block light moving upward.

2. The light fixture of claim 1, wherein the LED strip is not visible when looking at the light fixture from outside.

3. The light fixture of claim 1, further comprising a sheet of transparent material placed directly in front of the light sources.

4. The light fixture of claim 3, wherein the sheet of transparent material is glass.

5. The light fixture of claim 1, wherein the light fixture has two LED strips placed parallel to each other.

6. The light fixture of claim 3, further comprising a sheet of a film placed below the sheet of transparent material.

7. The light fixture of claim 4, further comprising a reflective sheet placed on top of the transparent sheet.

8. The light fixture of claim 1, further comprising a metal backing sheet to enclose the light fixture from top.

9. The light fixture of claim 8, wherein the metal is aluminum.

10. The light fixture of claim 1, wherein the fixture is not ferromagnetic.

11. The light fixture of claim 6, further comprising a layer of foam placed directly below the metal backing.

12. The light fixture of claim 1, wherein the frame has vertical portion that is further inside the light fixture than the vertical portion making the periphery of the frame.

13. The light fixture of claim 12, wherein the LED strips are placed directly on the vertical, portion that is further inside.

14. The light fixture of claim 12, wherein a void exists behind the vertical portion that is further inside.

15. The light fixture of claim 12, wherein the vertical portion that is further inside is configured to receive fasteners.

16. A light fixture comprising:
   a) a frame;
   b) a metal backing attached to a back of the frame; and
   c) one or more LED strips with a plurality of light sources placed running in a horizontal direction against a side of the frame, the LED strip placed in such manner that the light source of the LED strip has a vertical orientation and faces inside of the frame;
   d) a glass sheet placed in front of the LED strip;
   e) a film sheet below the LED strip;
   f) a reflective sheet behind the glass sheet; and
   g) a foam sheet behind the reflective sheet, in between the metal backing and the reflective sheet;
   wherein placement of the foam is configured to keep the reflective sheet straight and block light moving upward.

17. The light fixture of claim 16, wherein the frame has vertical portion that is further inside the light fixture than the vertical portion making the periphery of the frame.

18. The light fixture of claim 16, wherein the LED strips placed directly on the vertical portion that is further inside.

19. The light fixture of claim 16, wherein the LED strip is not visible when looking at the light fixture from outside.

20. The light fixture of claim 16, wherein two LED strips are placed parallel to each on opposing sides of the glass sheet.

* * * * *